United States Patent [19]

Saito

[11] Patent Number: 5,075,778
[45] Date of Patent: Dec. 24, 1991

[54] BACKLIGHT CORRECTION SYSTEM

[75] Inventor: Kenji Saito, Tokyo, Japan

[73] Assignee: Fuji Photo Film Co., Ltd., Kanagawa, Japan

[21] Appl. No.: 611,384

[22] Filed: Nov. 13, 1990

[30] Foreign Application Priority Data

Jan. 7, 1988 [JP] Japan .................................. 63-778

[51] Int. Cl.⁵ ............................................. H04N 5/26
[52] U.S. Cl. .................................. 358/228; 358/213.19
[58] Field of Search ............... 358/160, 168, 169, 170, 358/228, 174, 213.19, 162

[56] References Cited

U.S. PATENT DOCUMENTS

| | | | |
|---|---|---|---|
| 3,555,181 | 1/1971 | Thommen | 358/174 |
| 4,365,272 | 12/1982 | Nagai | 358/228 |
| 4,396,957 | 8/1983 | Tanaka | 358/228 |
| 4,821,100 | 4/1989 | Yamamoto | 358/170 |

FOREIGN PATENT DOCUMENTS 62-274874 11/1987 Japan .
63-193772 8/1988 Japan .

Primary Examiner—James J. Groody
Assistant Examiner—David E. Harvey
Attorney, Agent, or Firm—Sughrue, Mion, Zinn, Macpeak & Seas

[57] ABSTRACT

A television camera with automatic lens opening control provides pictures from backlighted scenes which neither overly darken the subject nor overly brighten the background. The lens opening is controlled by the average value of the incident light intensity, but not before the incident light intensity is subjected to a white compression process. The signal corresponding to the incident light is processed by a white compression circuit to compress the brighter portions of the signal. The compressed output is averaged and used to control the lens opening.

7 Claims, 1 Drawing Sheet

BACKLIGHT CORRECTION SYSTEM

This is a continuation of application Ser. No. 293,739, filed Jan. 4, 1989, now abandoned.

FIELD OF THE INVENTION

This invention relates to a backlight correction system, which is used to good advantage in a television camera having an auto-iris system.

DESCRIPTION OF THE PRIOR ART

In general, a television camera has an auto-iris system, for example, to automatically adjust an iris stop of the lens according to an average value of incident light intensity. The auto-iris system operates to adjust the iris stop so that the average level of the video signal based on the output signal of a photographing device is always at a constant value.

Therefore, when a backlighted subject is photographed, the lens opening is greatly affected by a bright portion of the background such as the sky and is adjusted according to the high-brightness portion. Accordingly, the brightness level of the subject, that is, the video signal level corresponding to the subject, is reduced relatively. As a result, the subject in the reproduced image becomes darker all over resulting in a deterioration of image quality such that, when the subject is a person, the face features are obscured.

The conventional technique for avoiding such problems is to change the manual control of the auto-iris system during a backlighted shot. Thus, the appropriate lens opening is selected manually to catch normally the reflected light from the subject and to photograph the subject.

There are some video cameras which have a backlight correction function. In such cases, backlight correction is made by driving a backlight correction switch to increase the gain of an AGC circuit, thereby bringing the level of the video signal representing the subject, which has been relatively lowered by the function of the auto-iris system, back to around a normal level. However, this system is defective because image information of the background, which is a high-brightness portion, is lost, resulting in deterioration of quality of the reproduced picture.

More specifically, while the photographing device, particularly that of a CCD, is able to output video signals up to a 300% level (the level of video signal when the reference level of NTSC 100IRE is assumed as 100%), the television cathode ray tube (CRT) as a monitoring device is able to reproduce video signals of up to 120%. In general, a TV camera has a process amplifier unit which performs various signal processing procedures on the video signal based on the output signal of the photographing device. The process amplifier unit, in view of the difference in sensitivity between the photographing device and the CRT performs signal processing procedures called white compression and white clipping. The white compression procedure continuously compresses the video signal of the high-brightness portion, for example, of 90 to 300%, to suppress the peak level of the video signal down to around 120%. The white clipping procedure is to cut off the video signal cf the high-brightness portion exceeding 120%.

Therefore, either when the iris stop is adjusted manually to the subject or when the AGC circuit gain is increased the background portion is clipped and the video signal of that portion will be lost. Further, in the latter case, by increasing the gain of the AGC circuit, noise will also be amplified, resulting in deterioration of picture quality.

SUMMARY OF THE INVENTION

With a view to obviate the above-described prior art defects of backlight correction systems for use in a television camera having an auto-iris system, it is a primary object of the present invention to provide a backlight correction system which is able to assure good image quality even in a backlighted shot.

In accordance with the present invention which attains the above object, there is provided a backlight correction system for use in an auto-iris system which automatically adjusts the iris stop of a television camera using a photographing device by taking an average-value information of incident light intensity, characterized by a white compression circuit to compress the level of video signals exceeding a predetermined value based on output signals of the photographing device.

With the present invention of the above-described arrangement when the background is of a high brightness for example, at a backlighted shot, the high-brightness portion exceeding a predetermined value is compressed, the average level of video signals becomes smaller than that for the uncompressed case, and the auto-iris system operated based on the average level is adjusted to a greater iris stop than that for the case of prior art systems. As a result, the luminance of the subject is maintained sufficiently light and information of the background area is normally reserved even after the signal processing by the process amplifier.

DETAILED DESCRIPTION OF PREFERRED EMBODIMENT

Figure 1:
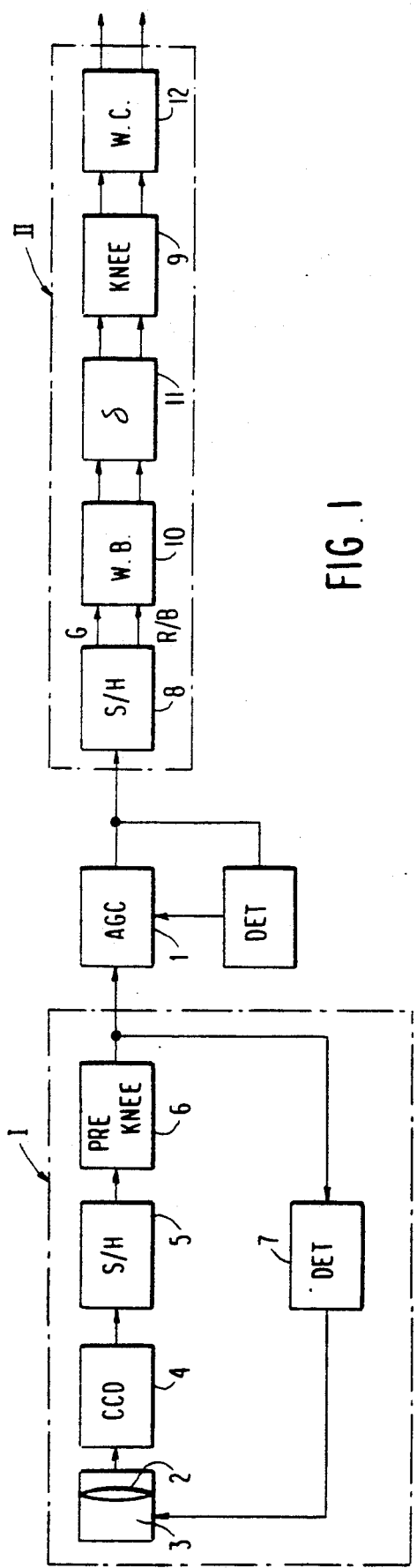
FIG. 1 is a block diagram showing a television camera having an embodiment of the present invention.

A preferred embodiment of the present invention will now be described with reference to the drawings. FIG. 1 is a block diagram showing a television camera according to a preferred embodiment of the present invention. Referring to FIG. 1, the television camera comprises an auto-iris system I and a process amplifier II, connected to one another through an AGC circuit 1.

The auto-iris system I is composed of an iris stop 3 for adjusting the opening of a lens 2, a photographing device 4, which is a CCD in this embodiment, a sample hold circuit 5, a white compression circuit 6, and an auto-iris detector 7. A picture including the subject focused by the lens 2 is converted into an electrical signal by the photographing device 4, which is then converted to a video signal by the sample hold circuit 5 for signal separation. The white compression circuit 6 compresses the portion of the video signal exceeding a predetermined level. In this embodiment, the portion exceeding 110 to 120% is compressed so that the peak level is 150%. The auto-iris detector 7 averages the level of the video signal output of the white compression circuit 6, and adjusts the opening of the iris stop 3 according to the average value.

The process amplifier II is composed of a sample hold circuit 8 for color separation, a white compression circuit 9, a white balance circuit 10, a gamma-value correction circuit 11, and a white clipping circuit 12, which are similar to those used in prior art systems. A video signal as an output of the AGC circuit 1 is supplied through the color-separation sample hold circuit 8 to the white balance circuit 10, and then through the gamma-value correction circuit 11 to the white compression circuit 9. The white compression circuit 9 compresses the portion of the video signal exceeding 90 to 100% so that the peak level is 120%. The video signal processed in the white compression circuit 9 is supplied to the white clipping circuit 12. The white clipping circuit 12 cuts off the portion of the video signal exceeding 120% in view of the reproduction characteristics of the television CRT.

Figure 2C:
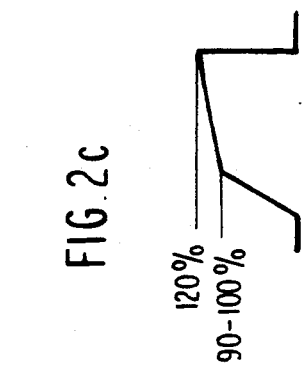
FIGS. 2(a) to 2(c) are graphs showing input/output characteristics of various parts of the television camera.
Figure 2B:
Figure 2A:

In the television camera with the above-described arrangement, the CCD photographing device 4 outputs a video signal up to 300% as shown in FIG. 2(a). The white compression circuit 6 continuously compresses the portion of the video signal exceeding 110-120% to 150% as shown in FIG. 2(b). The white compression circuit 9 continuously compresses the portion of the video signal exceeding 90-100% to a range of (90-100)% to 120% as shown in FIG. 2(c).

The detector 7 which determines the amount of feedback of the auto-iris system I of this embodiment according to the present invention is supplied with a video signal which is white compression processed by the white compression circuit 6. Thus the background portion of the subject which is a high-brightness portion in the backlighted shot for example, at a level of 300%, is suppressed in level, the opening of the iris stop 3 is determined by the average value of video signal at this state and a parameter corresponding to the opening is supplied from the detector 7 to the iris stop 3. Therefore, the opening of the iris stop becomes greater than that for the prior art system, thereby maintaining the level of the video signal representing the subject at an adequate value without an excessive decrease from that for normal lighting. Incidentally, Japanese people's skin looks most natural at a level of abut 60%.

Since, in this embodiment, the high-brightness portion is compressed before the video signal level is averaged effects of the brightness of background portion at the backlighted shot on the opening of the iris stop 3 can be reduced, and the iris stop 3 can be adjusted to an opening according to the brightness of the subject.

Furthermore, since the video signal is compressed to a maximal peak level of 150% by the white compression circuit 6, cut-off of information of the high-brightness portion can be considerably reduced in the signal processing in the process amplifier II. In this connection, the white compression circuit 9 continuously compresses the portion of video signal exceeding 90-100% to a range of (90-100)% to 120%, and the white clipping circuit 12 cuts off the portion of the video signal exceeding the 120% level.

With the present invention as described above the high-brightness portion of the video signal is compressed, and the iris stop opening can be adjusted according to the brightness of the subject without substantially affecting the high-brightness portion. e.g., the background of a backlighted shot. Since the information of the high-brightness portion is not lost even by the signal processing in the process amplifier, a reproduced picture of very good quality can be obtained.

What is claimed is:

1. In a television camera of the type comprising an auto-iris system and a process amplifier system providing a camera output signal, said auto-iris system comprising and adjustable iris-stop, a lens, means for developing a video signal corresponding to the incident light intensity, and feedback means for adjusting the iris stop in accordance with an average video signal level, the improvement characterized by a backlight correction circuit, having a nonlinear response as a function of the instantaneous video signal level prior to saturation, for selectively compressing the bright portion of said developed video signal prior to connection to said feedback means and said process amplifier system.

2. The invention of claim 1 wherein said backlight correction system comprises a white compression circuit for compressing the portion of said video signal exceeding a predetermined level, said white compression circuit being connected to receive said video signal.

3. A television camera for receiving incident light images comprising an auto iris system, said system comprising:
   an adjustable iris-stop for limiting said received incident light,
   a lens for focusing said limited light,
   a photographing means for converting said limited incident light intensity passing through said lens into a video signal representing said incident light intensity,
   a white compression circuit, having nonlinear response as a function of the instantaneous video signal level prior to saturation, for selectively compressing those portions of said video signal above a first predetermined level, said circuit providing a first output video signal corresponding to said video signal except that the portions above said first predetermined level are compressed, and
   means responsive to said first output video signal for adjusting said iris stop.

4. The camera of claim 1 wherein said process amplifier system further comprises at least one of a gamma correction circuit, a white compression circuit and white clipping circuit.

5. The camera of claim 2 further comprising a process amplifier means for receiving said first output video signal and for further processing said signal to produce a camera output signal.

6. The camera of claim 5 wherein said process amplifier means comprises means for compressing said first output video signal above a second predetermined level.

7. The camera of claim 6 wherein said process amplifier means further comprises means for clipping said first output video signal above a third predetermined level.

* * * * *